United States Patent
Ionov et al.

(10) Patent No.: US 7,321,731 B2
(45) Date of Patent: *Jan. 22, 2008

(54) OPTICAL PULSE POSITION MODULATION DISCRIMINATOR

(75) Inventors: Stanislav I. Ionov, Calabasas, CA (US); Thomas W. Ball, Torrance, CA (US); Peter Chu, Torrance, CA (US); William S. Hoult, Jr., Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 679 days.

This patent is subject to a terminal disclaimer.

(21) Appl. No.: 10/820,915

(22) Filed: Apr. 7, 2004

(65) Prior Publication Data

US 2005/0226624 A1    Oct. 13, 2005

(51) Int. Cl.
*H04J 4/00*       (2006.01)
*H04J 14/00*      (2006.01)
*G08C 19/16*      (2006.01)
*H03M 1/00*       (2006.01)

(52) U.S. Cl. .................. 398/75; 398/102; 398/148; 340/870.21; 341/137; 341/157

(58) Field of Classification Search .............. 398/47, 398/75, 148–150, 98, 102; 340/870.21; 341/137, 341/155, 157
See application file for complete search history.

(56) References Cited

U.S. PATENT DOCUMENTS

| 6,266,173 | B1 | 7/2001 | Hayes |
| 6,456,422 | B1 | 9/2002 | Hayes et al. |
| 6,462,860 | B1 * | 10/2002 | Ionov .................. 359/325 |
| 6,466,703 | B1 | 10/2002 | Ionov |
| 2004/0109695 | A1 * | 6/2004 | Watanabe ............ 398/186 |
| 2005/0095010 | A1 * | 5/2005 | Ionov .................. 398/189 |
| 2005/0226635 | A1 * | 10/2005 | Ionov et al. .......... 398/161 |

OTHER PUBLICATIONS

"Nonlinear Fiber Optics," Second Edition, by Govind P. Agrawal, The Institute of Optics, University of Rochester, New York, 1995, pp. 28-50, 60-75, and 89-111.

(Continued)

*Primary Examiner*—Jason Chan
*Assistant Examiner*—Nathan Curs
(74) *Attorney, Agent, or Firm*—MacPherson Kwok Chen & Heid LLP; Greg J. Michelson (57) ABSTRACT

Systems and methods are disclosed herein to provide various optical techniques. For example, in accordance with an embodiment of the present invention, a pulse position modulation discriminator architecture is disclosed for discriminating temporal positions of PPM-encoded optical pulses by converting them from time modulated to frequency modulated signals. As another example, time division multiplexed optical signals may be translated to wavelength division multiplexed optical signals. One or more of the architectures disclosed herein may be implemented, for example, to provide PPM to FM or time to wavelength conversion for receiver or transmitter applications.

33 Claims, 7 Drawing Sheets

OTHER PUBLICATIONS

"Comparison of Interferometric All-Optical Switches for Demultiplexing Applications in High-Speed OTDM Systems," Colja Schubert et al., Journal of Lightwave Technology, vol. 20, No. 4, Apr. 2002.

"160-Gb/s All Optical Demultiplexing Using a Gain-Transparent Ultrafast-Nonlinear Interferometer (GT-UNI)," by C. Schubert et al., IEEE Photonics Technology Letters, vol. 13, No. 5, May 2001.

"40-Gb/s Demultiplexing Using an Ultrafast Nonlinear Interferometer (UNI)," by N. S. Patel et al., IEEE Photonics Technology Letters, vol. 8, No. 12, Dec. 1996.

"Gain-Transparent SOA-Switch for High-Bitrate OTDM Add/Drop Multiplexing," by S. Diez et al., IEEE Photonics Technology Letters, vol. 11, No. 1, Jan. 1999.

* cited by examiner

OPTICAL PULSE POSITION MODULATION DISCRIMINATOR

TECHNICAL FIELD

The present invention relates generally to optics and, more particularly, to optical techniques, such as optical pulse position modulation discrimination.

BACKGROUND

Optical applications, such as for optical communications, are well known and gaining in popularity due to the many advantages associated with optical signals relative to electrical signals. For optical applications, there are many types of modulation schemes, each offering various advantages and disadvantages.

For example, optical pulse position modulation (PPM) offers a large signal-to-noise (SNR) improvement relative to some modulation schemes. An M-ary PPM coding scheme, as an example, with M equal to sixteen (four bits of information are encoded in the temporal position of an optical pulse) provides a 3 dB savings in optical power compared to differential phase shift keying (DPSK) modulation.

Proposed PPM optical communication systems generally have certain drawbacks. For example, a proposed optical PPM receiver may be intrinsically analog in nature and require high-bandwidth electronic analog-to-digital converters (ADCs) for digital communication applications. The ADCs are generally difficult to design for frequencies of 10 GHz or greater. Furthermore, the ADCs increase system complexity and may reduce operational margins and reliability.

As another example, a proposed PPM receiver may be based on non-linear optical loop mirrors (NOLM), which may require careful balancing and adjustments. The PPM receiver may also require a number of erbium-doped fiber amplifiers (EDFAs) and optical filters with flat dispersion, which adds further to the complexity and design constraints. As a result, there is a need for improved optical techniques, such as for example improved PPM communication techniques.

SUMMARY

Systems and methods are disclosed herein to provide various optical techniques. For example, in accordance with an embodiment of the present invention, an architecture is disclosed for discriminating temporal positions of PPM-encoded optical pulses. The PPM-encoded optical pulses may be discriminated by the conversion of time modulation to frequency modulation, with the frequency modulated optical signal optionally converted to a digital electrical signal (e.g., by frequency shift keying (FSK) detection) or an analog electrical signal. As an example, a PPM receiver incorporating this architecture would not require ADCs to provide a digital electrical signal, which may result in a considerable reduction in system complexity. As another example, a portion of the architecture may be employed to convert time division multiplexed (TDM) optical signals to wavelength division multiplexed (WDM) optical signals.

As another example, in accordance with an embodiment of the present invention, an architecture is disclosed for converting PPM-encoded optical pulses into frequency modulated (FM) pulses, with the frequency modulated signals available, for example, for transmission through a communications channel. The FM signal (e.g., M-ary FSK signal) transmission may offer approximately the same theoretical noise advantage as PPM signal transmission and may provide certain implementation advantages.

More specifically, in accordance with one embodiment of the present invention, a pulse position modulation discriminator includes a fiber assembly adapted to provide self-phase modulation and dispersion to a first optical signal; an optical switch adapted to receive the first optical signal from the fiber assembly and a second optical signal and provide a third optical signal, wherein the third optical signal has a wavelength based on a delay associated with the first optical signal relative to the second optical signal; a demultiplexer adapted to receive the third optical signal and provide the third optical signal to one of a plurality of channels based on the wavelength; a plurality of photodetectors corresponding to the plurality of channels and adapted to convert the third optical signal into an electrical signal; and a discriminating circuit coupled to the photodetectors and adapted to receive the electrical signal and determine which of the plurality of channels provided the electrical signal, wherein the discriminating circuit provides a digital output signal.

In accordance with another embodiment of the present invention, a method of decoding pulse position modulated optical signals includes receiving a first optical signal and a second optical signal, wherein the first optical signal comprises pulse position modulated optical signals; broadening a spectrum and chirping the first optical signal or the second optical signal; providing a third optical signal having a wavelength based on a delay of the first optical signal relative to the second optical signal; and providing an electrical output signal based on the wavelength of the third optical signal.

In accordance with another embodiment of the present invention, an apparatus includes a fiber assembly adapted to spectrally broaden and chirp a first optical signal; and an optical switch coupled to the fiber assembly and adapted to receive the first optical signal and a second optical signal and provide a third optical signal with a wavelength dependent upon a relative delay between the first optical signal and the second optical signal.

In accordance with another embodiment of the present invention, a method of converting pulse position modulated optical signals to frequency modulated optical signals includes providing self-phase modulation and dispersion to a first optical signal; selecting a portion of the first optical signal at a first wavelength based on a time difference between the first optical signal and a second optical signal, wherein the first optical signal or the second optical signal comprises pulse position modulated optical signals; and providing an optical output signal having the first wavelength.

In accordance with another embodiment of the present invention, a pulse position modulation discriminator includes dispersive elements adapted to impart a chirp onto a first optical signal and a second optical signal, wherein the first optical signal comprises pulse position modulated pulses; and an optical nonlinearity device adapted to receive the first optical signal and the second optical signal and provide a third optical signal whose wavelength is based on a time delay between the first optical signal and the second optical signal.

In accordance with another embodiment of the present invention, a method of discriminating pulse position modulated optical signals includes receiving a first optical signal comprising pulse position modulated optical signals; receiving a second optical signal; providing a third optical signal having a wavelength based on a relative time difference between a pulse of the first optical signal and a pulse of the second optical signal; and providing an electrical output signal whose value is based on the wavelength of the third optical signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
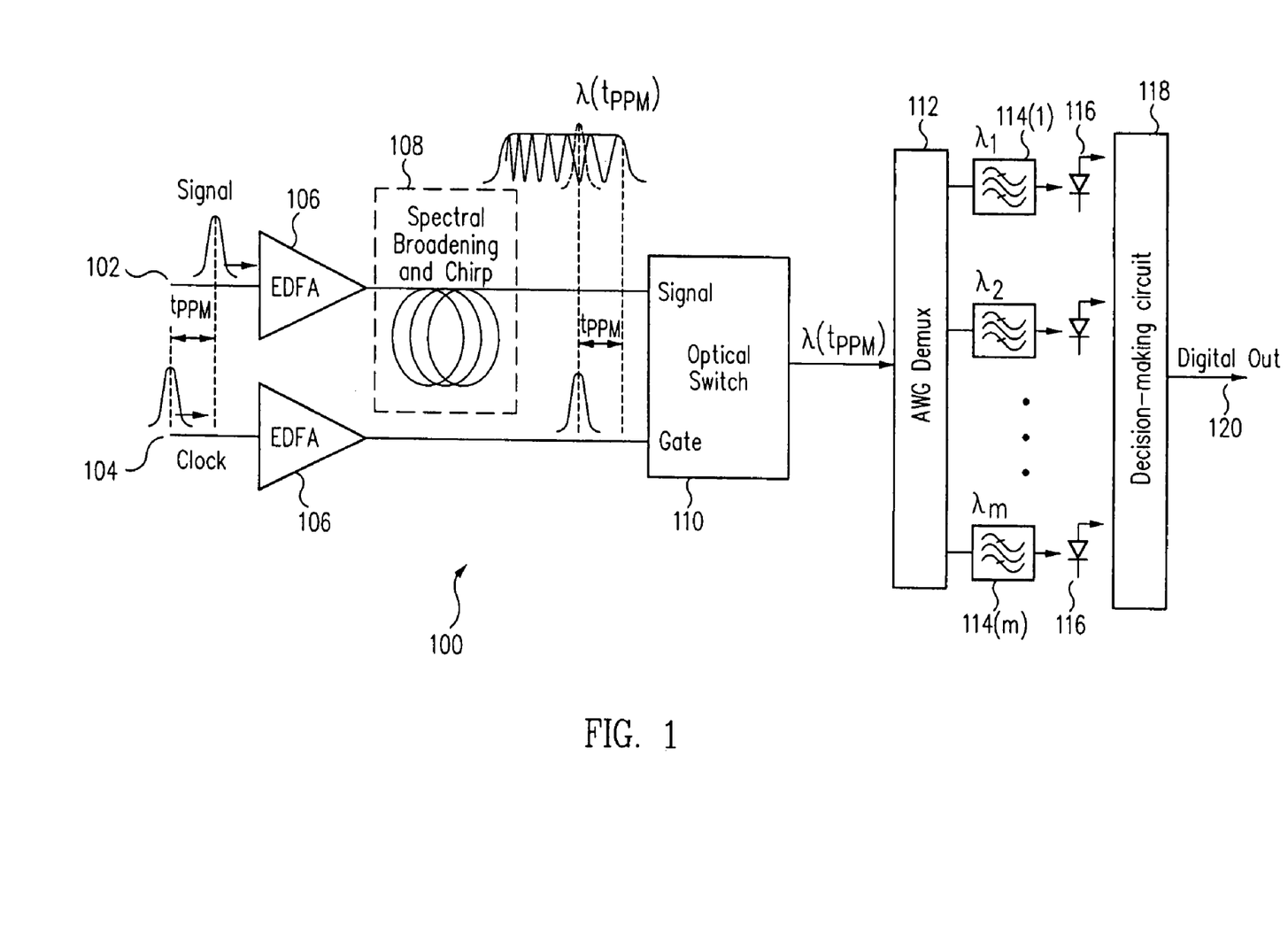
FIG. 1 shows a block diagram illustrating a pulse position modulation discriminator architecture in accordance with an embodiment of the present invention.

FIG. 1 shows a block diagram illustrating a pulse position modulation (PPM) discriminator architecture 100 in accordance with an embodiment of the present invention. Architecture 100 includes optical amplifiers 106, a fiber assembly 108, an optical switch 110, a demultiplexer 112, filters 114, photodetectors 116, and a discriminating circuit 118.

An input signal 102 and a clock signal 104 are received (e.g., via fiber cable or via cableless transmission such as by free space transmission) and amplified by corresponding optical amplifiers 106, if necessary (e.g., optical amplifiers may be optional, depending upon the application and requirements). Optical amplifiers 106, for example, may be erbium-doped fiber amplifiers (EDFAs).

Input signal 102 (i.e., one or more signal pulses) may be spectrally broadened and chirped in fiber assembly 108. Alternatively, clock signal 104 (i.e., a clock pulse), instead of input signal 102, may be routed through fiber assembly 108 to be spectrally broadened and chirped. The spectral broadening and chirping, for example, may be produced in optical fibers via self-phase modulation (SPM) and dispersion, respectively, as is known in the art. Furthermore, the amount of SPM required to achieve the desired spectral broadening may be controlled by fiber non-linearity and optical power as is also known in the art.

The duration of the chirped optical pulse of input signal 102 at optical switch 110 may be chosen equal to the duration of a single clock period of clock signal 104. The duration of the chirped pulse, as noted above, may be controlled by dispersion. The bandwidth of the chirped pulse of input signal 102 may be represented as $\Delta\lambda_{ch}$ and designed to be wider than $M\Delta\lambda_c$, or in other words, $\Delta\lambda_{ch} \geq M\Delta\lambda_c$, where $\Delta\lambda_c$ is the bandwidth of the clock pulse of clock signal 104, M is equal to $2^n$ which is equal to the number of possible pulse positions within the clock period of clock signal 104, and "n" is the number of bits encoded on a single signal pulse of input signal 102.

The chirped signal of input signal 102 and clock pulses (e.g., short clock pulses) of clock signal 104 are fed into a signal input and a gate input, respectively, of optical switch 110 (e.g., an ultrafast optical switch). A slice of the chirped input pulse of input signal 102 is selected by optical switch 110, during the presence of a gate pulse (i.e., a clock pulse) from clock signal 104, and provided as an output signal from optical switch 110 to demultiplexer 112. Because the wavelength of the chirped pulse of input signal 102 changes linearly from its leading to trailing edge, the output wavelength of the output signal depends on the delay between the chirped input pulse and the gate pulse and, consequently, between input signal 102 and clock signal 104 as received by architecture 100.

Thus, it should be understood that a time division multiplexed (TDM) to wavelength division multiplexed (WDM) operation may be provided by a portion of architecture 100. For example, if input signal 102 is a TDM optical signal, optical switch 110 may provide a WDM optical signal based on the TDM optical signal of input signal 102. Therefore, as an example, at least a portion of architecture 100 (and similarly a portion of architecture 800 (FIG. 8) discussed herein) may be employed to support TDM to WDM operations, which for example are conventional formats for terrestrial communication systems and fiber links.

The output signal from optical switch 110 is demultiplexed into one of M channels by demultiplexer 112, which is determined by the wavelength of the output signal from optical switch 110. The demultiplexing may be achieved in a number of different ways. For example, the demultiplexing by demultiplexer 112 may be performed by employing a commercially available arrayed-waveguide grating (AWG) demultiplexer (as illustrated in FIG. 1), followed optionally by filters 114 (e.g., narrowband filters that may improve the signal-to-noise ratio (SNR)). Alternatively, as an example, the output signal from optical switch 110 may be split into the M channels by employing as demultiplexer 112 a wavelength-independent star coupler (rather than an AWG demultiplexer), which is followed by filters 114.

The output signal from optical switch 110, after being demultiplexed by demultiplexer 112 and filtered (optionally) by filters 114 (referenced as filters 114(1) through 114(m)), is converted from the optical domain to the electrical domain by photodetectors 116 (e.g., photodiodes). Discriminating circuit 118 receives signals from photodetectors 116 and provides an output signal 120 (e.g., a digital output signal) by determining which of the M channels contains the optical pulse within a given clock period of clock signal 104. Discriminating circuit 118 may be implemented as a decision-making circuit in any number of conventional ways, as is known in the art. Because the wavelength of the output signal from optical switch 110 is determined by the delay between the optical pulses from input signal 102 and clock signal 104, the output signal is routed to one of photodetectors 116 according to the temporal pulse position of the signal pulse of input signal 102 relative to clock signal 104.

It should be understood that, for some applications, it may not be desirable to convert the output signal from optical switch 110 to a digital electrical signal. Consequently, the output signal from optical switch 110 (or similarly for the output signal from optical nonlinearity device 806 described in reference to FIG. 8) may be converted to an analog electrical signal (e.g., by an analog discriminator or optical FM discriminator) in accordance with one or more embodiments of the present invention. For example, U.S. Pat. No. 6,456,422 entitled "Direct Optical FM Discriminator" and U.S. Pat. No. 6,266,173 entitled "Optical FM receiver," which are incorporated herein by reference in their entirety, describe exemplary techniques for converting an optical signal to an analog electrical signal.

Optical switch 110 may be implemented by employing various types of ultrafast optical switches (e.g., operating at repetition rates as high as 160 Gb/s). For example, optical switch 110 may be implemented as an ultrafast non-linear interferometer (UNI), a semiconductor laser amplifier in a loop mirror (SLALOM), or as a Mach-Zehnder interferometer (MZI), which are illustrated in an exemplary fashion in FIGS. 2a, 2b, and 2c, respectively, in accordance with embodiments of the present invention.

Figure 2A:
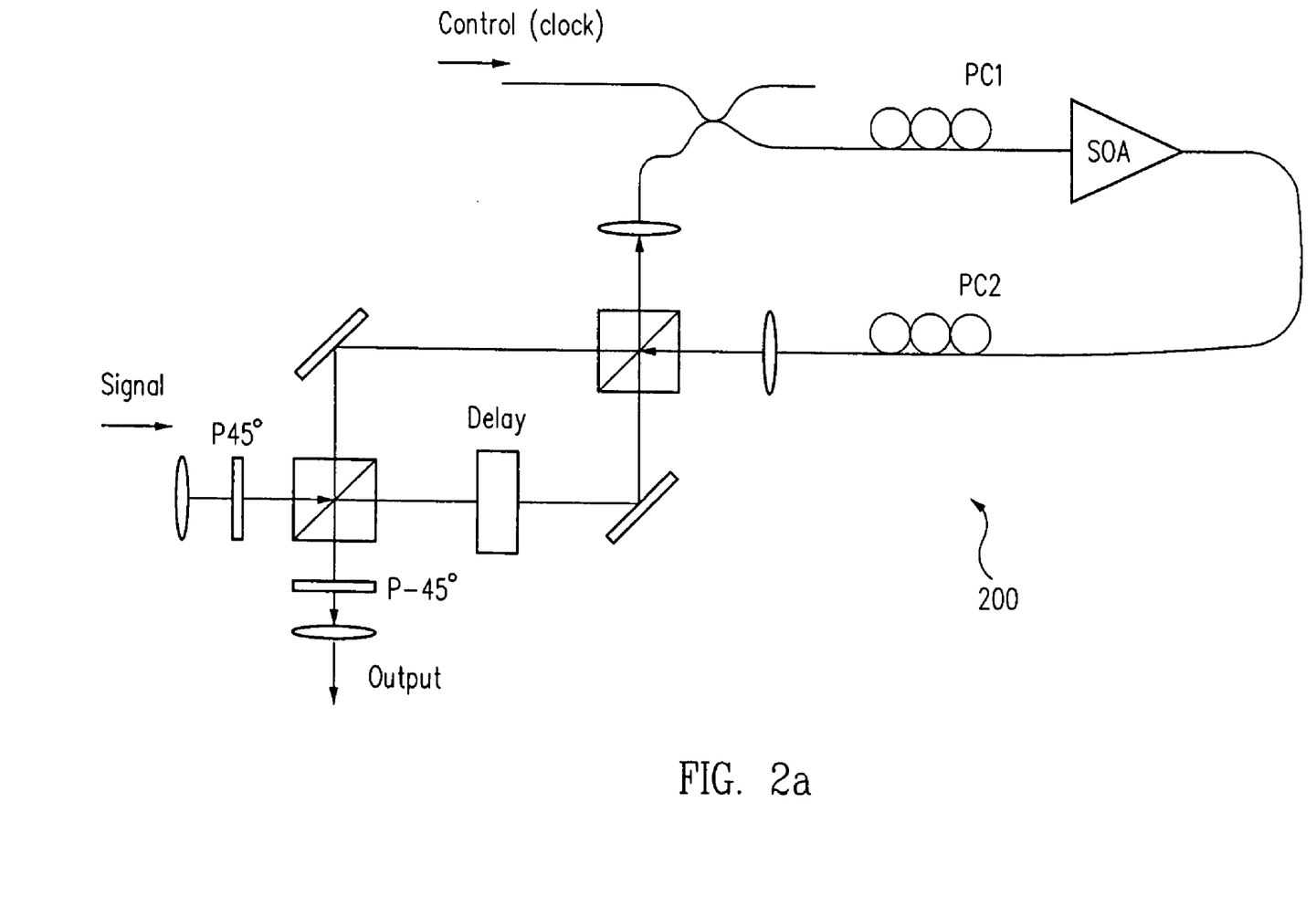
FIGS. 2a, 2b, and 2c show block diagrams illustrating optical switch architectures in accordance with embodiments of the present invention.
Figure 2B:
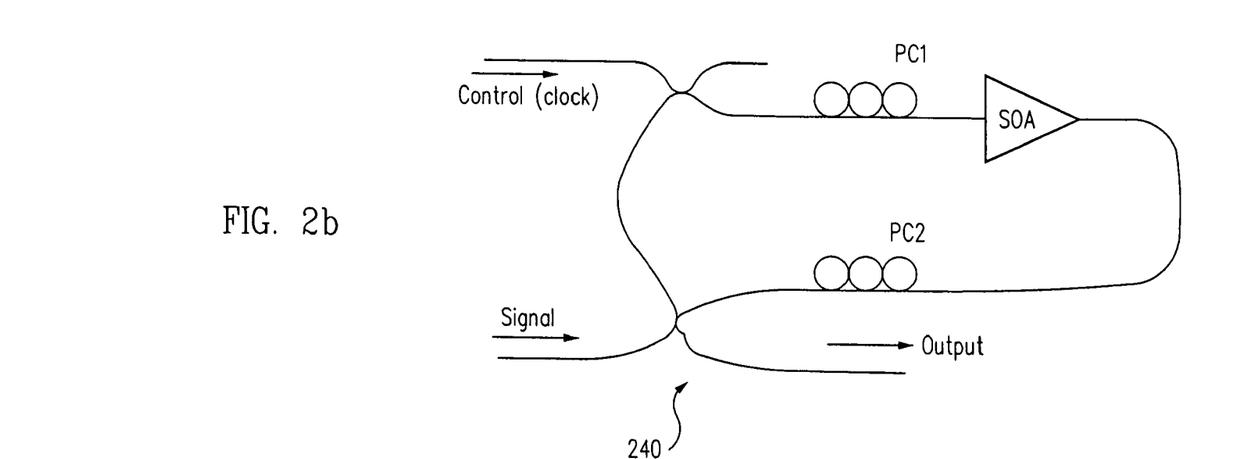
Figure 2C:
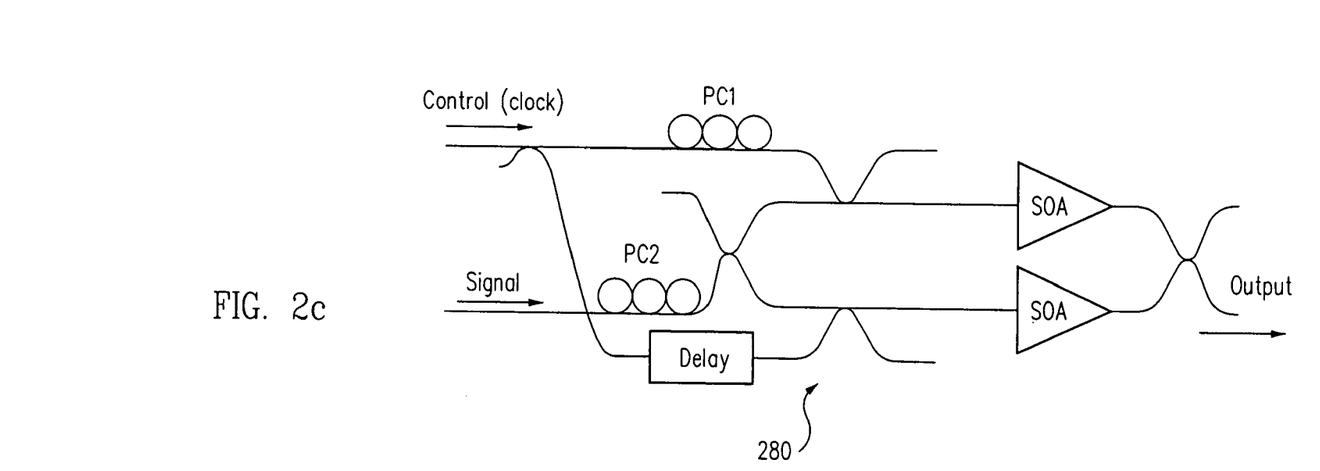

As shown in FIG. 2a, a UNI 200 may function as an ultrafast optical gate (switch) and include polarizer controllers (labeled PC1 and PC2), a semiconductor optical amplifier (labeled SOA), and polarizers (labeled P45° and P-45°). A SLALOM 240 (FIG. 2b) or a MZI 280 (FIG. 2c) may function as an ultrafast optical gate (switch), with SLALOM 240 employing an SOA and polarizer controllers (labeled PC1 and PC2) and MZI 280 employing SOAs and polarizer controllers (labeled PC1 and PC2).

Figure 3:
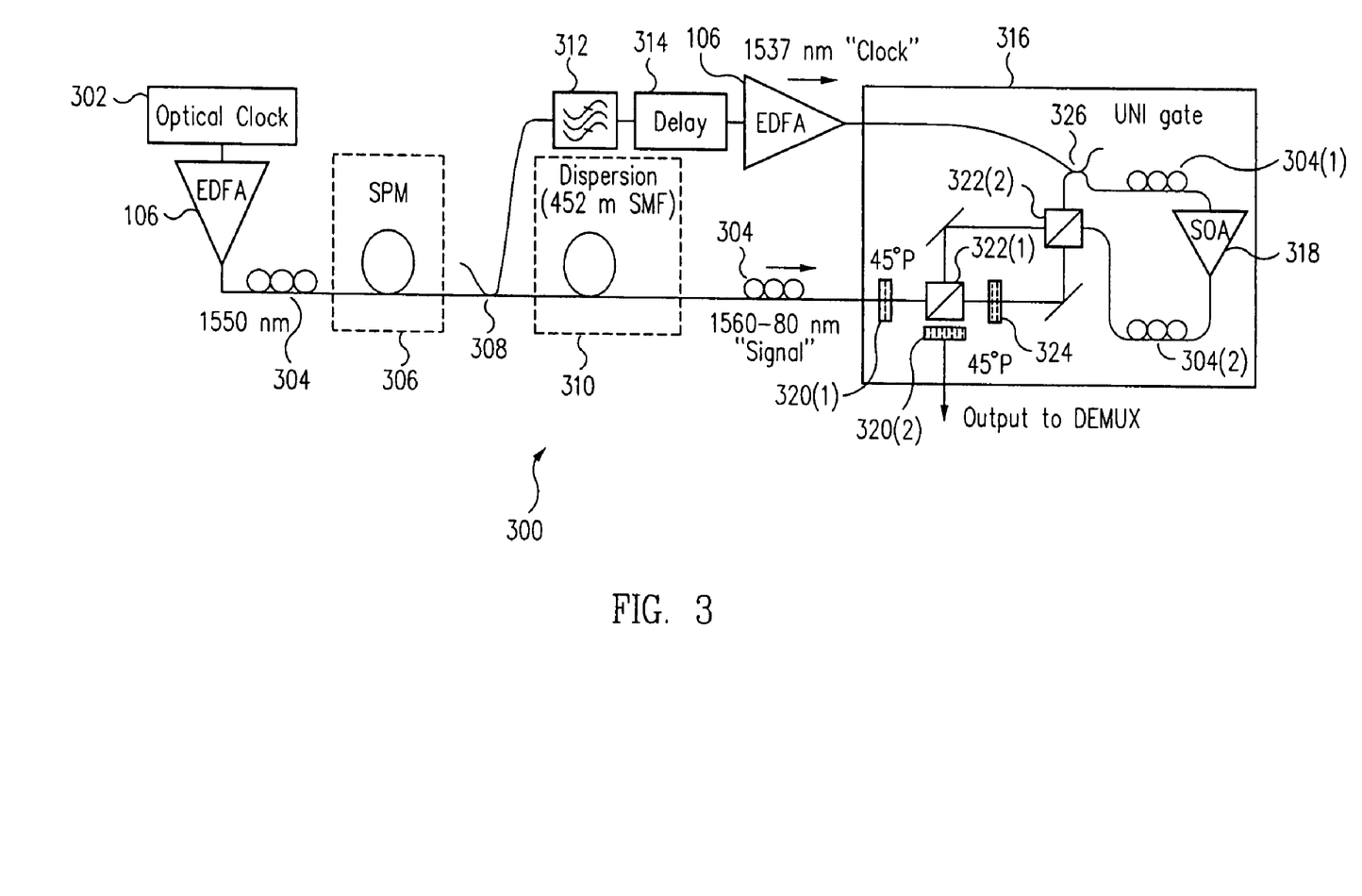
FIG. 3 shows a block diagram illustrating an exemplary pulse position modulation discriminator architecture in accordance with an embodiment of the present invention.

One or more of the operational principles of an optical PPM discriminator, such as disclosed herein for architecture 100, may be demonstrated with an experimental test setup. For example, FIG. 3 shows a block diagram illustrating an exemplary architecture 300 for demonstrating pulse position modulation discriminator techniques in accordance with an embodiment of the present invention. Architecture 300 includes an optical clock 302, optical amplifiers 106, polarization controllers (PCs) 304, an SPM element 306 (e.g., a highly nonlinear fiber (HNLF) for SPM), a coupler 308, a dispersive element 310, a filter 312, a delay 314, and a UNI switch 316.

Optical clock 302 generates an optical signal, which is routed through optical amplifier 106, PC 304, SPM element 306, and to coupler 308, resulting in a clock signal and an input signal (which travel along corresponding clock signal and input signal paths). The clock signal is passed through filter 312, delay 314, and optical amplifier 106 before entering UNI switch 316, while the input signal is passed through dispersive element 310 and PC 304 before entering UNI switch 316.

UNI switch 316 may be utilized to demonstrate one or more of the operational principles of an optical PPM discriminator in accordance with one or more embodiments of the present invention. UNI switch 316 is a free space design and based on an SOA (i.e., SOA 318), as illustrated in FIG. 3. Alternatively, one of the many variations of UNI optical switches, as are known in the art, may be substituted for UNI switch 316.

The input signal enters UNI switch 316 in a linear polarization state oriented at 45° with respect to the principle polarization axis of UNI switch 316. The input signal passes through a polarizer 320(1) (an input polarizer) and split into two equal parts by a first polarizing beam splitter 322(1). The two polarizations of the input signal travel along two corresponding arms of UNI switch 316 before they are recombined by a second polarizing beam splitter 322(2) and launched into a fiber loop containing SOA 318. One of the arms of UNI switch 316 has a longer optical path length than the other arm, which is accomplished in this example by introducing a delay 324, such as a piece of quartz. The clock signal (e.g., control pulses) is combined with the input signal by a coupler 326 (e.g., a 3 dB coupler) before SOA 318. The resulting output signal from UNI switch 316 may be provided to a demultiplexer, as explained herein (e.g., in reference to FIG. 1), after passing through first and second polarizing beam splitters 322(1) and 322(2) and exiting via a polarizer 320(2) (an output polarizer).

Figure 4A:
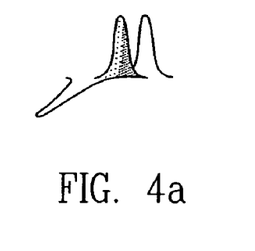
FIGS. 4a and 4b show temporal diagrams illustrating the propagation of optical pulses in accordance with an embodiment of the present invention.
Figure 4B:
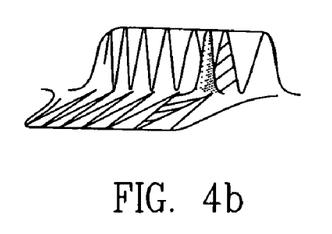

Referring briefly to FIGS. 4a and 4b, temporal diagrams of optical pulses propagating through an SOA of a UNI are illustrated. For example as illustrated in FIG. 4a, in a typical UNI device or gate designed for switching short optical pulses, as is known in the art, a control pulse (identified by gray shading) arrives at an SOA of the UNI device between "fast" and "slow" polarization components. The control pulse imprints a non-linear phase shift on the "slow" pulse only. After the SOA, the two polarization components of the signal continue through the UNI device in such a way that the "slow" component propagates along the signal's "fast" arm while the "fast" component propagates along the signal's "slow" arm.

In this configuration, the optical delay is cancelled after the return pass through the UNI device and the two polarization components are combined into a linear polarization state in the absence of the control pulses, with this polarization state blocked by a 45° polarizer at the output of the UNI device (optical switch). However, the non-linear phase shift imprinted on the "slow" component by the control pulse changes the polarization state at the output, thus opening the gate of the UNI device.

In accordance with an embodiment of the present invention, the implementation of the UNI device (UNI gate) may differ from conventional UNI devices due to the employment of very broadband and chirped signal pulses. For example as illustrated in FIG. 4b (for a UNI implementation for PPM discrimination via wavelength gating), the "slow" component is delayed by only a fraction of the total pulse width with respect to the "fast" component. However, the operational principle of the UNI gate with broadband and chirped pulses may be described in a similar fashion to the UNI gate with short signal pulses.

As an example, a chirped optical pulse may be viewed as a train of optical pulses whose central wavelength changes linearly from one pulse to another. The spectral components of the signal whose "fast" and "slow" polarizations arrive at the SOA prior to the control pulse (identified by gray shading in FIG. 4b) are not affected by the latter (i.e., control pulse), but are blocked by the output polarizer of the UNI gate. The spectral components whose "fast" and "slow" polarizations arrive at the SOA after the control pulse acquire identical phase shifts and, therefore, are also blocked. Thus, only the spectral component (identified by cross-hatchings in FIG. 4b for the two polarization states of the spectral component) whose fast and slow polarizations arrive, respectively, before and after the control pulse acquire different phase shifts and, therefore, are switched out by the UNI gate (and provided, for example, by the PPM discriminator as disclosed herein).

As an experimental example for architecture 300 (FIG. 3), transform-limited signal pulses having a 1 ps duration, a 3 nm bandwidth, a central wavelength (λ) of 1549 nm, and a 10 GHz repetition rate were amplified to 0.5 W average power by optical amplifier 106 (e.g., an EDFA) and provided to a three-section fiber assembly (i.e., SPM element 306) comprised of a first section of 100 m Vascade® LS fiber, followed by a second section of 16 m of SMF28, followed by a third section of 15 m of highly non-linear fiber with a mode area of 15 $\mu m^2$ and zero dispersion at 1552 nm (all three sections commercially available, such as for example from Corning Inc.). The first two sections of fiber compress the optical pulse down to 0.4 ps, which facilitates spectral broadening in the last section. The length of the second section (SMF 28 fiber) is chosen to compensate for dispersion acquired by the optical pulses in the first section.

Figure 5:
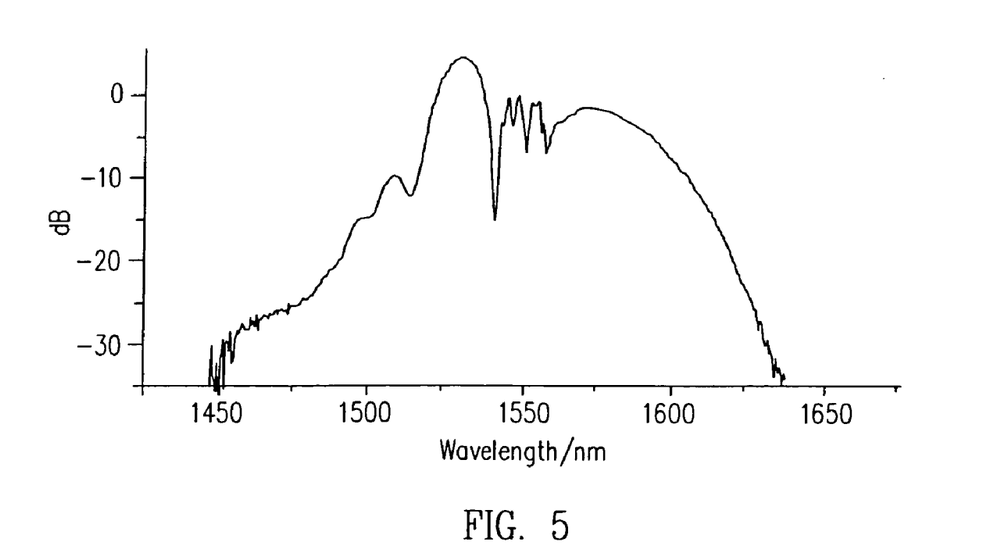
FIG. 5 shows a spectrum plot of a supercontinuum in accordance with an embodiment of the present invention.

An exemplary SPM-broadened spectrum plot (commonly referred to as a supercontinuum) based on the output of the SPM fiber (e.g., SPM element 306 made up of the three-section fiber assembly) is illustrated in FIG. 5 in accordance with an embodiment of the present invention. As an example for the broadband supercontinuum (FIG. 5) and architecture 300 (FIG. 3), the clock signal pulses for the clock path may be derived from a portion of the generated supercontinuum, such as for example by filtering out a 2.5 nm wide slice centered around 1536 nm (e.g., by employing filter 312). The clock signal pulses may be nearly Gaussian in shape with the time-bandwidth product 0.56 (i.e., nearly transform-limited, where a transform-limited Gaussian pulse has the time-bandwidth product of 0.44). The clock pulse train is delayed by a controlled amount by delay 314 and amplified by optical amplifier 106 (e.g., an EDFA) to 2-20 mW of average power and provided to a UNI gate (i.e., UNI switch 316), which combines the clock signal with the input signal via coupler 326 (e.g., a 3 dB coupler).

The nearly flat section of the supercontinuum centered around 1570 nm and having approximately 15 nm bandwidth may be chosen, for example, as the broadband signal. The input signal (broadband signal) is chirped by dispersive element 310 (e.g., in 452 m of SMF28), attenuated down to 100 mW, and coupled to a UNI optical gate (i.e., provided to UNI switch 316).

Polarizer 320(1) (the input polarizer) of UNI switch 316 may be set to 45°, with first polarizing beam splitter 322(1) splitting the incoming chirped signal into two equal arms of UNI switch 316 (the interferometer). One of the interferometer arms contains delay 324 (e.g., an optical delay comprised of a 5 mm thick quartz plate). The input signal beams propagating along the two paths are recombined and provided, along with the clock signal, to a fiber loop containing SOA 318 and two polarization controllers 304. As an example, SOA 318 may be current biased at 175 mA and be a commercially available SOA (e.g., model CQF872 from JDS Uniphase Corp.).

In general, a conventional UNI gate may only have one polarization controller (e.g., polarization controller 304(2) shown in FIG. 3) that adjusts the polarization at the exit of the fiber loop within the UNI gate so that the delayed component propagates through the short path and the non-delayed component propagates through the longer path. In accordance with an embodiment of the present invention, it may be advantageous to have another polarization controller (e.g., polarization controller 304(1) shown in FIG. 3) when broadband operation (e.g., greater than 10 nm) of the UNI gate is desired. The additional polarization controller helps to align the delayed and non-delayed polarizations along the principal axis of the SOA. Thus, only narrowband operations (e.g., 2 nm or less) of the UNI gate may be possible without such an alignment from the additional polarization controller (e.g., one or more PCs).

Polarizer 320(2) at the output of UNI switch 316 may be set to −45° for blocking the resulting signal light in the absence of the control pulses. Typically, for example, the blocked light due to polarizer 320(2) may be 10 dB or more below the completely open or unblocked signal light level. As an example, FIGS. 6a and 6b show exemplary plots of output signals from a pulse position modulation discriminator (e.g., output signals from UNI switch 316 of FIG. 3) in accordance with an embodiment of the present invention.

Figure 6A:
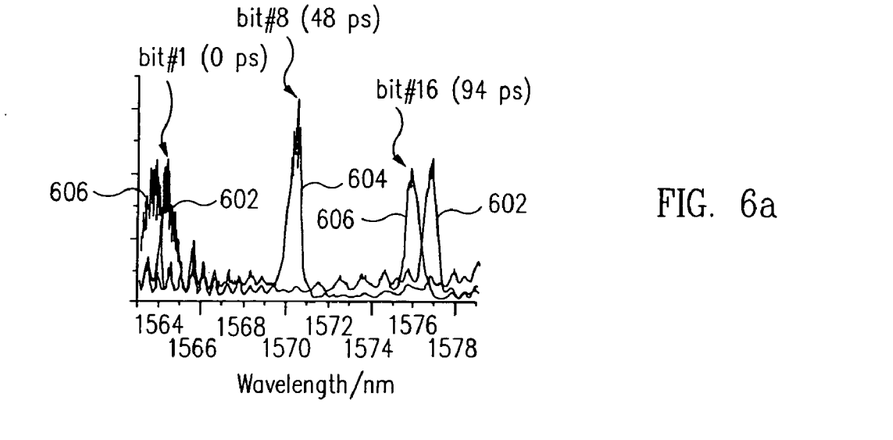
FIGS. 6a and 6b show plots of output signals from a pulse position modulation discriminator in accordance with an embodiment of the present invention.

FIG. 6a shows the output signals from the PPM discriminator for various delays between the signal and clock pulses. FIG. 6a also illustrates the exemplary total bandwidth occupied by 16 bits, with exemplary plots 602, 604, and 606 for the spectra of the UNI switch output signals for various bit positions (i.e., for the indicated delays between the signal and clock pulses). Specifically, plots 602, 604, and 606 illustrate output signals for bit positions 1, 8, and 16, respectively, corresponding to delays between the signal and clock pulses of 0, 48, and 94 picoseconds (ps).

Figure 6B:
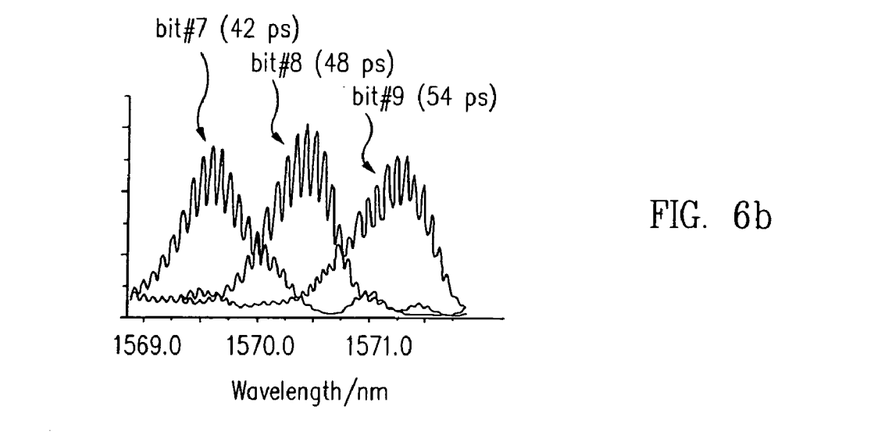

FIG. 6b illustrates that the PPM discriminator is capable of clearly resolving consecutive PPM bit positions that are separated, for example, by approximately 6 ps for a 10 GHz, 4-bit (i.e., M=16) PPM signal. As shown in FIG. 6b, exemplary bit positions 7, 8, and 9 are plotted having corresponding delays of 42, 48, and 54 ps. Additionally, as an example, the chirp of the broadband signal pulse may be adjusted to match the spectral separation of the PPM discriminator channels to that of a conventional wavelength division multiplexing (WDM) channel spacing of a commercial 100 GHz AWG demultiplexer.

Figure 7:
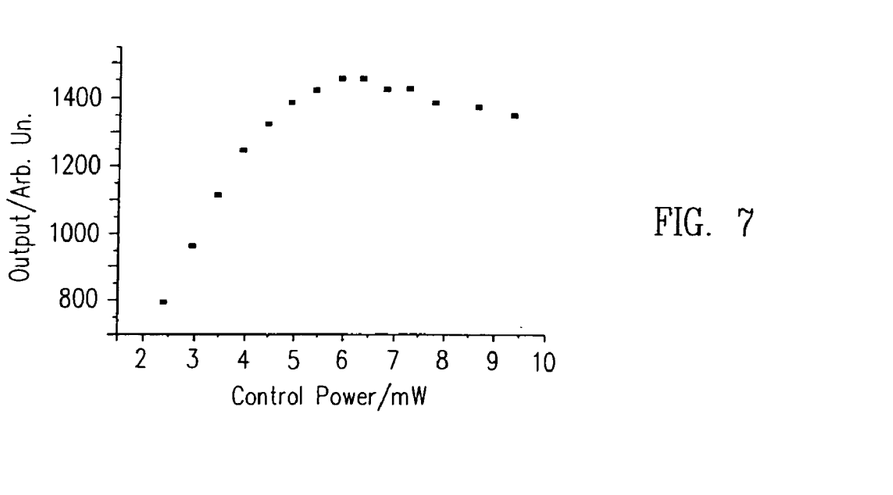
FIG. 7 shows a plot of the possible dependence of an optical switch output signal versus power for a pulse position modulation discriminator in accordance with an embodiment of the present invention.

FIG. 7 shows a plot of an exemplary dependence of an optical switch output signal (e.g., from a UNI switch) on the average power of the control pulses for a pulse position modulation discriminator in accordance with an embodiment of the present invention. As illustrated, the PPM discriminator output reaches its maximum at approximately 6 mW based on an average 600 mW peak power (approximately 6 pJ/pulse). It may be assumed that this pulse power imprints the differential phase shift of π on the signal, which opens up the gate of the PPM discriminator completely.

In accordance with one or more embodiments of the present invention, exemplary PPM discriminators are disclosed (e.g., architecture 100 of FIG. 1) that provide TDM to WDM conversion or PPM to frequency modulation (FM) conversion based, for example, on an optical switch and wavelength grating. Alternative all optical methods for converting PPM to FM may also be employed as described herein. For example, alternative methods of TDM to WDM or PPM to FM conversion include frequency conversion schemes having chirped local oscillator and signal waveforms.

Figure 8:
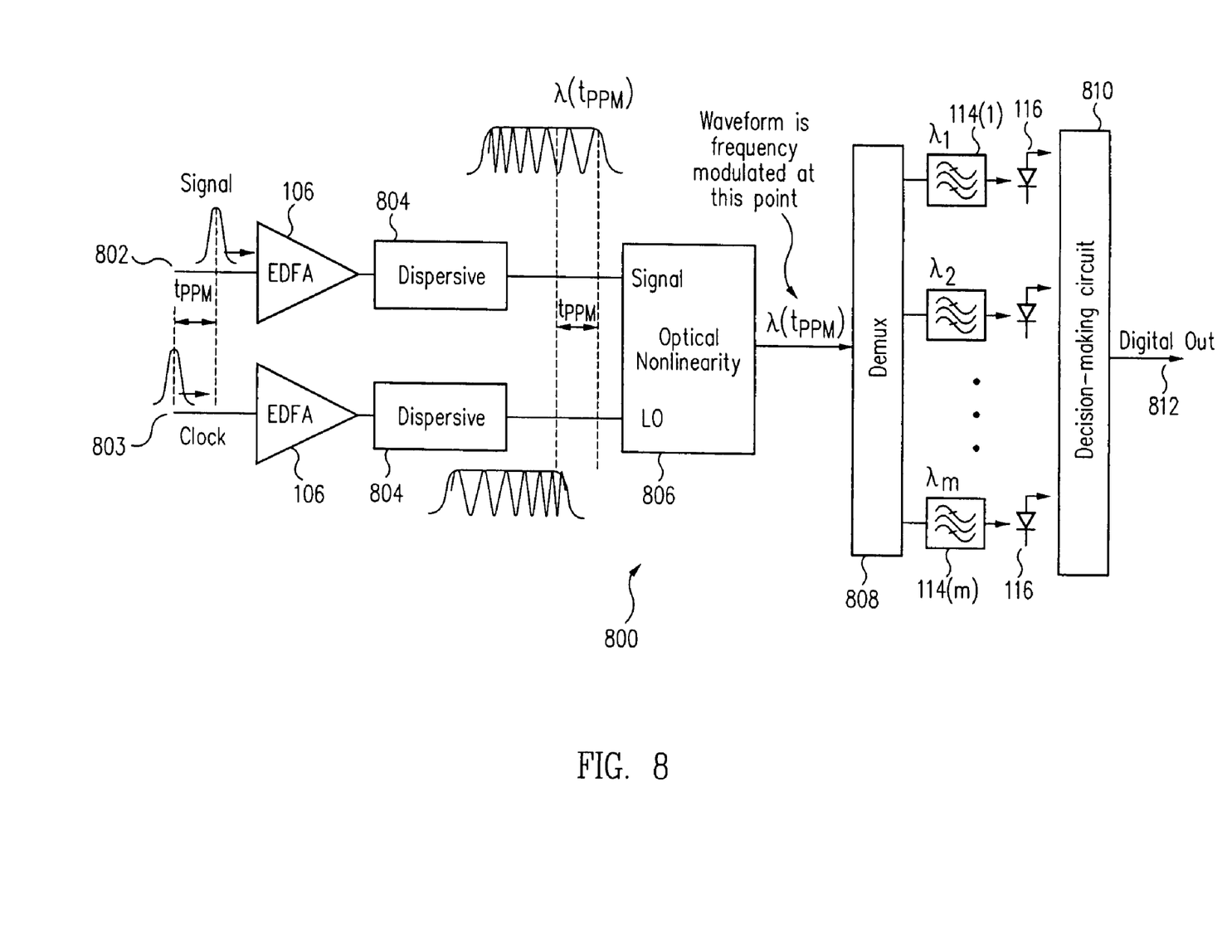
FIG. 8 shows a block diagram illustrating a pulse position modulation discriminator architecture in accordance with an embodiment of the present invention.

As a specific example, FIG. 8 shows a block diagram illustrating a pulse position modulation discriminator architecture 800 in accordance with an embodiment of the present invention. Architecture 800 includes optical amplifiers 106, dispersive elements 804, an optical nonlinearity device 806, a demultiplexer 808 (e.g., similar to demultiplexer 112 of FIG. 1), filters 114, photodetectors 116, and a discriminating circuit 810 (e.g., similar to discriminating circuit 118 of FIG. 1).

Architecture 800 receives an input signal 802 and a clock signal 803, which are amplified by optical amplifiers 106

(optical amplifiers 106 may be optional). Dispersive elements 804, which are known in the art (e.g., similar to dispersive element 310 of FIG. 3), are employed to impart a chirp onto the pulses of input signal 802 and clock signal 803. The rate and direction of frequency slew may be selected such that one specific mixing product generated in optical nonlinearity device 806 occurs at a constant frequency, even though the frequencies of the causal waveforms are continuously changing. Furthermore, the particular value of this constant output frequency from optical nonlinearity device 806 will be a linear function of the temporal offset between the pulses of input signal 802 and clock signal 803.

Optical nonlinearity device 806, for example, may be made of a thin nonlinear crystal (e.g., made of lithium niobate ($LiNbO_3$)) for generating the sum or difference of the signal waveforms (from input signal 802) and the clock signal waveforms (from clock signal 803). Optionally, SPM spectral broadening may be used to increase slew rate and therefore output frequency spacing, but would not generally be necessary.

In general, architecture 800 provides PPM to FM conversion using nonlinear mixing of a chirped input signal (i.e., from input signal 802) and a local oscillator signal (i.e., from clock signal 803). One approach is to slew the frequencies of input signal 802 and clock signal 803 (i.e., the local oscillator (LO) provided to optical nonlinearity device 806) at the same rate but in opposite directions. Consequently, the nonlinear product occurring at the sum of the two frequencies would maintain a steady frequency.

Another approach is to slew the frequencies of input signal 802 and clock signal 803 in the same direction, with the difference frequency from the nonlinear product selected (i.e., maintaining a steady frequency). This approach would likely have the best conversion efficiency, but may be disadvantageous as the resultant wavelength is widely separated from the wavelengths of clock signal 803 and input signal 802. This may limit the availability and/or performance of optical components needed to operate on the converted pulses.

Yet another approach, for example, would be to sweep the LO (i.e., from clock signal 803) in the same direction as that for input signal 802, but at a different rate (e.g., twice or one-half the sweep rate). For this example, one of the third order mixing products (e.g., upper or lower depending on whether the slower chirp is above or below the faster chirp) will occur at a constant frequency and need not be widely separated in frequency (or wavelength) from input signal 802 and clock signal 803. A disadvantage for this approach may be that conversion efficiency in the nonlinearity may be poorer than for a second order product (e.g., sum or difference frequency).

In accordance with one or more embodiments of the present invention, an all-optical PPM discriminator is disclosed that converts pulse position into wavelength and quantizes the spectral output (e.g., with pre-set bandpass filters). Because the conversion from the temporal to wavelength domain is carried out by optical means, the discriminator can operate at very high rates (e.g., a six picosecond temporal resolution). The discriminator may support, for example, energy efficient optical satellite or terrestrial communication links, with the communication link incorporating the discriminator weighing less and/or requiring less power than conventional communication links.

As an example and in accordance with an embodiment of the present invention, a receiver architecture (e.g., architecture 100) for discriminating temporal positions of PPM-encoded optical pulses via conversion of time modulation to frequency modulation is disclosed. The conversion may be followed, for example, by frequency shift keying (FSK) detection to discern the signal.

As another example and in accordance with an embodiment of the present invention, a transmitter architecture is disclosed for converting PPM signals to frequency modulated (FM) signals suitable for transmission. For example, a portion of architecture 100 or 800 may be utilized to convert PPM signals to FM signals (e.g., the signals provided by optical switch 110 of FIG. 1 or optical nonlinearity device 806 of FIG. 8), with the FM signals available for transmission by known transmitter devices. For example, a portion of architecture 100 or 800 may be incorporated into a transmitter architecture scheme.

Embodiments described above illustrate but do not limit the invention. It should also be understood that numerous modifications and variations are possible in accordance with the principles of the present invention. Accordingly, the scope of the invention is defined only by the following claims.

We claim:

1. A pulse position modulation discriminator comprising:
a fiber assembly adapted to provide self-phase modulation and dispersion to a first optical signal;
an optical switch adapted to receive the first optical signal from the fiber assembly and a second optical signal and provide a third optical signal, wherein the third optical signal has a wavelength based on a delay associated with the first optical signal relative to the second optical signal;
a demultiplexer adapted to receive the third optical signal and provide the third optical signal to one of a plurality of channels based on the wavelength;
a plurality of photodetectors corresponding to the plurality of channels and adapted to convert the third optical signal into an electrical signal; and
a discriminating circuit coupled to the photodetectors and adapted to receive the electrical signal and determine which of the plurality of channels provided the electrical signal, wherein the discriminating circuit provides a digital output signal.

2. The pulse position modulation discriminator of claim 1, further comprising optical amplifiers adapted to amplify the first optical signal and the second optical signal and provide the first optical signal and the second optical signal to the fiber assembly and the optical switch, respectively.

3. The pulse position modulation discriminator of claim 2, further comprising a plurality of filters corresponding to the plurality of channels and coupled between the demultiplexer and the plurality of photodetectors, wherein the plurality of filters are adapted to filter the third optical signal.

4. The pulse position modulation discriminator of claim 1, wherein a bandwidth of the first optical signal is greater than a bandwidth of the second optical signal times the number of channels.

5. The pulse position modulation discriminator of claim 1, wherein the optical switch comprises an ultrafast non-linear interferometer, a semiconductor laser amplifier in a loop mirror, or a Mach-Zehnder interferometer.

6. The pulse position modulation discriminator of claim 1, wherein the demultiplexer comprises an arrayed-waveguide grating demultiplexer or a wavelength-independent star coupler.

7. The pulse position modulation discriminator of claim 1, wherein the digital output signal indicates a temporal position of pulse position modulated optical pulses provided by the first optical signal or the second optical signal.

8. The pulse position modulation discriminator of claim 1, wherein the discriminating circuit provides frequency shift keying detection.

9. The pulse position modulation discriminator of claim 1, wherein the pulse position modulation discriminator forms part of a communications receiver.

10. A method of decoding pulse position modulated optical signals, the method comprising:
receiving a first optical signal and a second optical signal, wherein the first optical signal comprises pulse position modulated optical signals;
broadening a spectrum and chirping the first optical signal or the second optical signal;
providing a third optical signal having a wavelength based on a delay of the first optical signal relative to the second optical signal; and
providing an electrical output signal based on the wavelength of the third optical signal.

11. The method of claim 10, wherein the electrical output signal is a digital signal indicating a temporal position of the pulse position modulated optical signals of the first optical signal.

12. The method of claim 10, further comprising amplifying the first optical signal and the second optical signal.

13. The method of claim 12, further comprising filtering the third optical signal.

14. The method of claim 13, wherein the providing of the electrical output signal further comprises converting the third optical signal to an electrical signal.

15. The method of claim 10, further comprises routing the third optical signal to one of a plurality of paths based on the wavelength, wherein the electrical output signal indicates which of the paths provided the third optical signal.

16. An apparatus comprising;
a fiber assembly adapted to spectrally broaden and chirp a first optical signal; and
an optical switch coupled to the fiber assembly and adapted to receive the first optical signal and a second optical signal and provide a third optical signal with a wavelength dependent upon a relative delay between the first optical signal and the second optical signal.

17. The apparatus of claim 16, wherein the first optical signal or the second optical signal provides a pulse position modulated optical signal, the apparatus converting the pulse position modulated optical signal to a frequency modulated optical signal.

18. The apparatus of, claim 17, wherein the apparatus forms part of a communications system adapted to transmit the frequency modulated optical signal.

19. The apparatus of claim 17, further comprising:
optical amplifiers adapted to amplify the first and second optical signals;
a demultiplexer adapted to receive the third optical signal and route the third optical signal to one of a plurality of paths based on its wavelength;
a plurality of filters corresponding to the plurality of paths and adapted to filter the third optical signal;
a plurality of photodetectors corresponding to the plurality of filters and adapted to convert optical signals to electrical signals; and
a decision-making circuit adapted to receive the electrical signals from the plurality of photodetectors and provide a digital output signal whose value corresponds to a temporal position of the pulse position modulated optical signal.

20. The apparatus of claim 19, wherein the decision-making circuit is adapted to determine which of the plurality of paths provided the third optical signal and indicate this determination by a value of the output signal.

21. The apparatus of claim 17, wherein the fiber assembly comprises a self-phase modulation section and a dispersion section.

22. A method of converting pulse position modulated optical signals to frequency modulated optical signals, the method comprising:
providing self-phase modulation and dispersion to a first optical signal;
selecting a portion of the first optical signal at a first wavelength based on a time difference between the first optical signal and a second optical signal, wherein the first optical signal or the second optical signal comprises pulse position modulated optical signals; and
providing an optical output signal having the first wavelength.

23. The method of claim 22, further comprising transmitting the optical output signal, wherein the optical output signal is a frequency modulated optical signal based on the pulse position modulated optical signals.

24. The method of claim 22, further comprising:
amplifying the first optical signal and the second optical signal;
routing the optical output signal to one of a plurality of optical paths based on the first wavelength;
converting the optical output signal to an electrical output signal; and
determining which of the optical paths provided the optical output signal based on the electrical output signal and providing a digital output signal whose value is based on the time difference between the first optical signal and the second optical signal.

25. A pulse position modulation discriminator comprising:
dispersive elements adapted to impart a chirp onto a first optical signal and a second optical signal, wherein the first optical signal comprises pulse position modulated pulses; and
an optical nonlinearity device adapted to receive the first optical signal and the second optical signal and provide a third optical signal whose wavelength is based on a time delay between the first optical signal and the second optical signal.

26. The pulse position modulation discriminator of claim 25, wherein the pulse position modulation discriminator forms part of a transmitter, with the third optical signal transmitted as frequency modulated pulses.

27. The pulse position modulation discriminator of claim 25, further comprising:
a demultiplexer adapted to receive the third optical signal and provide the third optical signal to one of a plurality of channels based on the wavelength;
a plurality of photodetectors corresponding to the plurality of channels and adapted to convert the third optical signal into an electrical signal; and
a discriminating circuit coupled to the photodetectors and adapted to receive the electrical signal and determine which of the plurality of channels provided the electrical signal, wherein the discriminating circuit provides a digital output signal.

28. The pulse position modulation discriminator of claim 27, further comprising a plurality of filters corresponding to the plurality of channels and adapted to filter optical signals in the channels.

29. The pulse position modulation discriminator of claim 25, wherein the frequencies of the first optical signal and the second optical signal are slewed at the same rate but in opposite directions, at the same rate and direction, or at a different rate but in the same direction.

30. A method of discriminating pulse position modulated optical signals, the method comprising;
receiving a first optical signal comprising pulse position modulated optical signals;
receiving a second optical signal;
providing a third optical signal having a wavelength based on a relative time difference between a pulse of the first optical signal and a pulse of the second optical signal; and
providing an electrical output signal whose value is based on the wavelength of the third optical signal.

31. The method of claim 30, wherein the providing the third optical signal further comprises:
providing self-phase modulation and dispersion to the first optical signal or the second optical signal; and
selecting a portion of the first optical signal or the second optical signal, depending upon which received the self-phase modulation and the dispersion, based on the relative time difference, with the portion providing the wavelength for the third optical signal.

32. The method of claim 31, further comprising
routing the third optical signal to one of a plurality of paths based on the wavelength;
converting the third optical signal to an electrical signal; and
determining which path contained the third optical signal based on the electrical signal, wherein the electrical output signal is a digital signal.

33. The method of claim 30, wherein the providing the third optical signal further comprises:
providing dispersion to the first optical signal and the second optical signal; and
selecting a portion of the first optical signal or the second optical signal based on the relative time difference, with the portion providing the wavelength for the third optical signal.

* * * * *